Patented Jan. 12, 1932

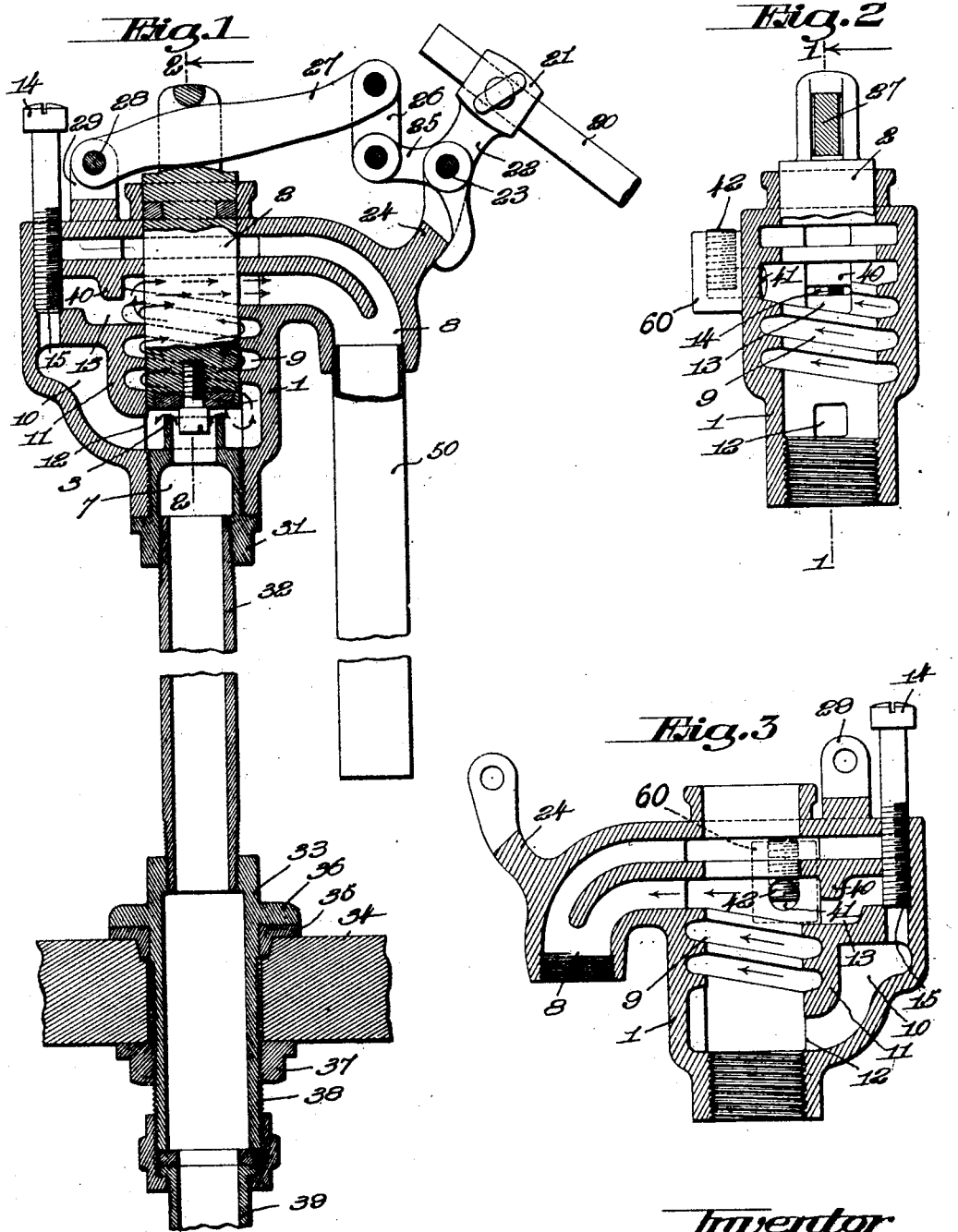

1,840,309

UNITED STATES PATENT OFFICE

ANDREW F. CURTIN, OF MEDFORD, MASSACHUSETTS

BALL COCK

Application filed August 15, 1929. Serial No. 385,932.

The present invention relates to an improvement in ball cocks, and more particularly to an improvement in ball cocks provided with a water passage surrounding a valve and connecting the inlet and outlet of such formation that the flow of the water therethrough is retarded.

In the accompanying drawings illustrating the preferred form of the invention, Fig. 1 is a vertical sectional elevation taken on the line 1—1, Fig. 2, looking from front to rear; Fig. 2 is a transverse sectional elevation taken on the line 2—2, Fig. 1; and Fig. 3 is a vertical sectional elevation taken on the line 1—1, Fig. 2, but looking in the opposite direction from Fig. 1, i. e., from rear to front, to show the refill boss on the front of the valve in dotted lines.

The illustrated embodiment of the invention is described as follows:—The cock has the valve shell or body 1, in which is received a longitudinally movable valve 2 controlled by the float. The float is attached to the lever 20, secured in the arm 21 of the bell crank lever 22, pivoted at 23 on the ear 24, which is projected upward from one side of the valve shell or body 1. The other arm 25 of the bell crank lever is connected by a link 26 with the lever 27, pivoted at 28 on a second ear 29, projecting from the side of the valve shell or body 1. This lever 27 is received in a hole in the valve 2, and when the water rises in the tank the float is lifted and the bell crank lever 22 is turned to depress the valve 2 against the valve seat 3, formed on the upper end of the valve seat member 31, which is screw-threaded into the valve shell or body. The valve body is supported on the pipe 32, which screws into the hole in the bottom of the valve seat member 31. This pipe 32 at its lower end screws into the ball cock support 33, which passes down through the bottom 34 of the tank and rests upon the packing washer 35, and is provided with a flange 36 which engages the packing washer 35 and is clamped against it by the nut 37, which is screwed on the outside of the exteriorly threaded depending stem 38 of the support. By turning up the nut 37, the packing is clamped tightly to make a watertight joint with the bottom of the tank. The service pipe 39 is connected by a union with the support member.

The valve seat member 31 houses the water inlet 7. When the valve 2 is raised, the cock is opened and water flows from the inlet 7 to the outlet 8 through a circuitous or spiral passage 9, which has a retarding effect upon the flow of water, thereby reducing or eliminating the hissing sound accompanying the slow closing of the valve; besides, the valve closes rather quickly, as explained in the Curtin Patent No. 829,462, dated August 28, 1906, lines 96–103, which also reduces the duration of the closing time. In addition to this circuitous, spiral or retarding passage 9, which constitutes the main stream water passage, the ball cock is provided with an auxiliary free-flowing water passage or by-pass 10, located in the valve shell or body 1, and separated from the circuitous passage by the inner wall 11. One end of the by-pass gives into an inlet chamber 12 surrounding the valve seat 3. This chamber receives a stream of water from the inlet before it passes into the circuitous passage 9. The other end of the by-pass 10 gives into the outlet chamber 13, into which the retarding passage 9 discharges, and which, in turn, discharges through the outlet 8. A screw valve 14 is received in the discharge end of the by-pass, and seats itself at 15 just below the discharge chamber 13. When the stream of water flowing through the discharge 9 is under sufficient pressure to fill the tank within the desired time, the valve 14 is screwed down on the seat 15. Where, however, the water pressure falls below the required degree, the valve 14 is unscrewed to an extent sufficient to permit the necessary additional quantity of water to pass out through the outlet chamber 13, and the outlet 8 to fill the tank within the required time. Under normal conditions of use, that is to say, when the water is under normal pressure, the valve 14 is permitted to remain seated and the stream of water, when the valve 2 is unseated, flows only through the circuitous or spiral retarding passage 9 on its way from the inlet 7 to the outlet 8. But under abnormal conditions, that is to say, in places where the water pressure falls below normal, the valve 14 is unscrewed until the volume of water flowing through the opening thereby made between the passage 10 and the outlet chamber 13 is large enough, together with the water flowing through the circuitous passage, to fill the tank within the required time.

In general, the operation of the ball cock above described is the same as the operation of the ball cock of the patent to the present inventor dated April 18, 1916, No. 1,179,507. There is, however, this addition to be made: The construction illustrated in the said patent admits the by-pass water into the stream flowing through the passage 9 in such a way that as the valve 2 approaches its seat with some pressures of water, the water admitted through the regulating valve 14 causes a disagreeable hissing sound. This it is the special object of this invention to overcome and avoid. The outlet 13 of the said patent is an elongated opening overlapping two portions of the passage 9. In the construction herein shown, this outlet 13 is curved and delivers its water to the lower of the two portions of the passage 9, with the result that the hissing sound is prevented at all adjustments of the regulating valve 14. It is believed that the reason for this is found in the fact that the by-pass stream is directed straight against the side of the main stream passing through the main passage 9, where the by-pass stream strikes the main stream.

By reference to Fig. 2 it will be noticed that the upper end of the main passage 9 engages the water flowing from the outlet 13 at substantially right angles, and that the main water stream is broken up by the by-pass stream at the outlet of the latter, with the result stated, namely, that the flow of water from the ball cock is silenced. This is conveniently accomplished by interposing a lip 40 in the path of the by-pass stream, causing it to take the bent form shown in Fig. 1.

The valve body is provided on its front side with a boss 60 (Figs. 2 and 3) connected by the passage 41 (Fig. 3) with the outlet chamber 13. A screw 42 is screwed into a threaded hole extending down into the boss 60. Some tank outlet valves have no provision for refill of the closet bowl. In such cases, the screw 42 is removed, and a refill pipe or tube is screwed into the opening of the boss 60, so that a refill supply of water may be provided through the overflow pipe of the tank and thus below the outlet valve of the tank to the closet bowl. The ball cock valve is provided with the down pipe 50, which leads the water discharged by the outlet 8 down into the tank from the service pipe to the bottom of the tank so that its lower end is most of the time submerged in the water in the tank.

Having thus described the invention, what is claimed is:

1. A ball cock having, in combination, a body having an inlet chamber and an outlet chamber, a main retarding flow passage connecting the inlet and the outlet, a valve seat located in the inlet, a valve movable longitudinally in the valve body and adapted to press against the valve seat for controlling the flow of water in the inlet, an auxiliary or free-flow by-pass passage connecting the inlet chamber with the outlet chamber, the discharge end of the by-pass passage being located in the bottom of the outlet chamber, and means for permitting a portion of the water passing through the inlet to flow through the by-pass.

2. A ball cock having, in combination, a valve body having an inlet chamber and an outlet chamber, a main retarding flow passage connecting the inlet chamber and the outlet chamber, a valve movable in the valve body for controlling the flow of water through the passage, an auxiliary or free-flow by-pass passage connecting the inlet chamber and the outlet chamber, having its discharge end opening into the outlet chamber at the upper end of the retarding flow passage, and a valve for regulating the flow of water through the by-pass operating when opened wider with decreased water pressure to shorten the valve operating time.

In testimony whereof I have signed my name to this specification.

ANDREW F. CURTIN.